United States Patent
Dunham

(10) Patent No.: US 10,412,947 B1
(45) Date of Patent: Sep. 17, 2019

(54) METHOD OF USING AN ARRANGEMENT FOR HOLDING AN ICE FISHING ROD AND AN ICE FISHING ROD DURING ICE FISHING ON A FROZEN BODY OF WATER AND APPARATUS THEREFOR

(71) Applicant: Richard Dunham, Greensburg, PA (US)

(72) Inventor: Richard Dunham, Greensburg, PA (US)

( * ) Notice: Subject to any disclaimer, the term of this patent is extended or adjusted under 35 U.S.C. 154(b) by 210 days.

(21) Appl. No.: 15/431,195

(22) Filed: Feb. 13, 2017

(51) Int. Cl.
| | |
|---|---|
| *A01K 97/01* | (2006.01) |
| *A01K 97/10* | (2006.01) |
| *A01K 99/00* | (2006.01) |
| *A01K 85/16* | (2006.01) |
| *E04H 15/00* | (2006.01) |
| *E04H 15/48* | (2006.01) |
| *E21B 10/44* | (2006.01) |

(52) U.S. Cl.
CPC .............. *A01K 97/01* (2013.01); *A01K 85/16* (2013.01); *A01K 97/10* (2013.01); *A01K 99/00* (2013.01); *E04H 15/001* (2013.01); *E04H 15/48* (2013.01); *E21B 10/44* (2013.01)

(58) Field of Classification Search
CPC .................................. A01K 97/01; A01K 97/10
USPC ........................................................... 43/4.5
See application file for complete search history.

(56) References Cited

U.S. PATENT DOCUMENTS

| | | | | |
|---|---|---|---|---|
| 2,752,115 A | * | 6/1956 | Green ..................... | A01K 97/10 248/156 |
| 2,869,814 A | * | 1/1959 | Hurlimann ............. | A01K 97/10 248/431 |
| 3,204,899 A | * | 9/1965 | Danielewicz .......... | A01K 97/10 248/188.6 |
| 3,530,611 A | * | 9/1970 | Britt ....................... | A01K 97/01 43/17 |
| 3,636,649 A | * | 1/1972 | Paiva ..................... | A01K 97/10 248/530 |
| 4,550,520 A | * | 11/1985 | Bogue .................... | A01K 97/10 248/512 |
| 4,694,603 A | * | 9/1987 | Anderson ............... | A01K 97/10 43/21.2 |
| 4,854,069 A | * | 8/1989 | Smith ..................... | A01K 97/10 43/21.2 |
| 5,038,511 A | * | 8/1991 | Gessner ................. | A01K 97/10 248/528 |
| 5,400,996 A | * | 3/1995 | Drish ..................... | A01K 97/10 248/171 |
| 6,128,848 A | * | 10/2000 | Wong ..................... | A01K 97/10 43/21.2 |
| 6,453,598 B1 | * | 9/2002 | Robertson .............. | A01K 97/10 43/21.2 |
| 6,651,374 B1 | * | 11/2003 | Ridlen ................... | A01K 97/10 248/514 |
| 6,691,973 B1 | * | 2/2004 | Barfield ................. | A01K 97/10 248/156 |

(Continued)

FOREIGN PATENT DOCUMENTS

| | | | | | |
|---|---|---|---|---|---|
| FR | 2557423 A1 | * | 7/1985 | ............. | A01K 97/10 |
| GB | 2056232 A | * | 3/1981 | ............. | A01K 97/10 |
| GB | 2119612 A | * | 11/1983 | ............. | A01K 97/10 |

*Primary Examiner* — Christopher P Ellis
(74) *Attorney, Agent, or Firm* — Nils H. Ljungman & Associates

(57) ABSTRACT

A holding arrangement can be used to hold an ice fishing rod during ice fishing on a frozen body of water. The holding arrangement, among other things, is designed to prevent an ice fishing rod from being pulled through an ice fishing hole and into the water by a fish.

1 Claim, 7 Drawing Sheets

(56) References Cited

U.S. PATENT DOCUMENTS

| | | | | |
|---|---|---|---|---|
| 6,772,551 | B1* | 8/2004 | Bielinski, Sr. | A01K 97/01 43/15 |
| 7,213,361 | B1* | 5/2007 | Perigo, Sr. | A01K 97/10 248/163.1 |
| 7,669,813 | B2* | 3/2010 | Crain | G01C 15/06 248/163.1 |
| 2002/0023996 | A1* | 2/2002 | Kondash | A01K 97/10 248/520 |
| 2003/0019143 | A1* | 1/2003 | Harris | A01K 97/01 43/4 |
| 2004/0118031 | A1* | 6/2004 | Nielson | A01K 97/01 43/21.2 |
| 2007/0017141 | A1* | 1/2007 | Coulnnan | A01K 97/01 43/17 |
| 2008/0016750 | A1* | 1/2008 | Benton | A01K 97/10 43/21.2 |
| 2011/0283593 | A1* | 11/2011 | Parkinson, III | A01K 91/02 43/19 |
| 2012/0204469 | A1* | 8/2012 | Kowalski | A01K 97/10 43/17.5 |
| 2013/0232844 | A1* | 9/2013 | Gallo | A45B 3/00 42/94 |
| 2014/0332655 | A1* | 11/2014 | Colbert | A01K 97/10 248/512 |
| 2015/0208633 | A1* | 7/2015 | Schramski | A01K 97/01 43/4.5 |
| 2016/0120161 | A1* | 5/2016 | Aiello | A01K 97/01 43/16 |
| 2016/0183509 | A1* | 6/2016 | Bricko | A01K 97/10 248/534 |
| 2016/0338334 | A1* | 11/2016 | Paczesny | A01K 97/12 |
| 2016/0366869 | A1* | 12/2016 | Schramski | A01K 97/01 |

* cited by examiner ent will. A
METHOD OF USING AN ARRANGEMENT FOR HOLDING AN ICE FISHING ROD AND AN ICE FISHING ROD DURING ICE FISHING ON A FROZEN BODY OF WATER AND APPARATUS THEREFOR

BACKGROUND

1. Technical Field

The present application relates to a method of using an arrangement for holding an ice fishing rod and an ice fishing rod during ice fishing on a frozen body of water and apparatus therefor.

2. Background Information

Background information is for informational purposes only and does not necessarily admit that subsequently mentioned information and publications are prior art.

SUMMARY

A method of using an arrangement for holding an ice fishing rod and an ice fishing rod during ice fishing on a frozen body of water and apparatus therefor.

The above-discussed exemplifications of the present invention will be described further herein below. When the word "invention" or "exemplification of the invention" is used in this specification, the word "invention" or "exemplification of the invention" includes "inventions" or "exemplifications of the invention", that is the plural of "invention" or "exemplification of the invention". By stating "invention" or "exemplification of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EXEMPLIFICATION OR EXEMPLIFICATIONS

Figure 1:
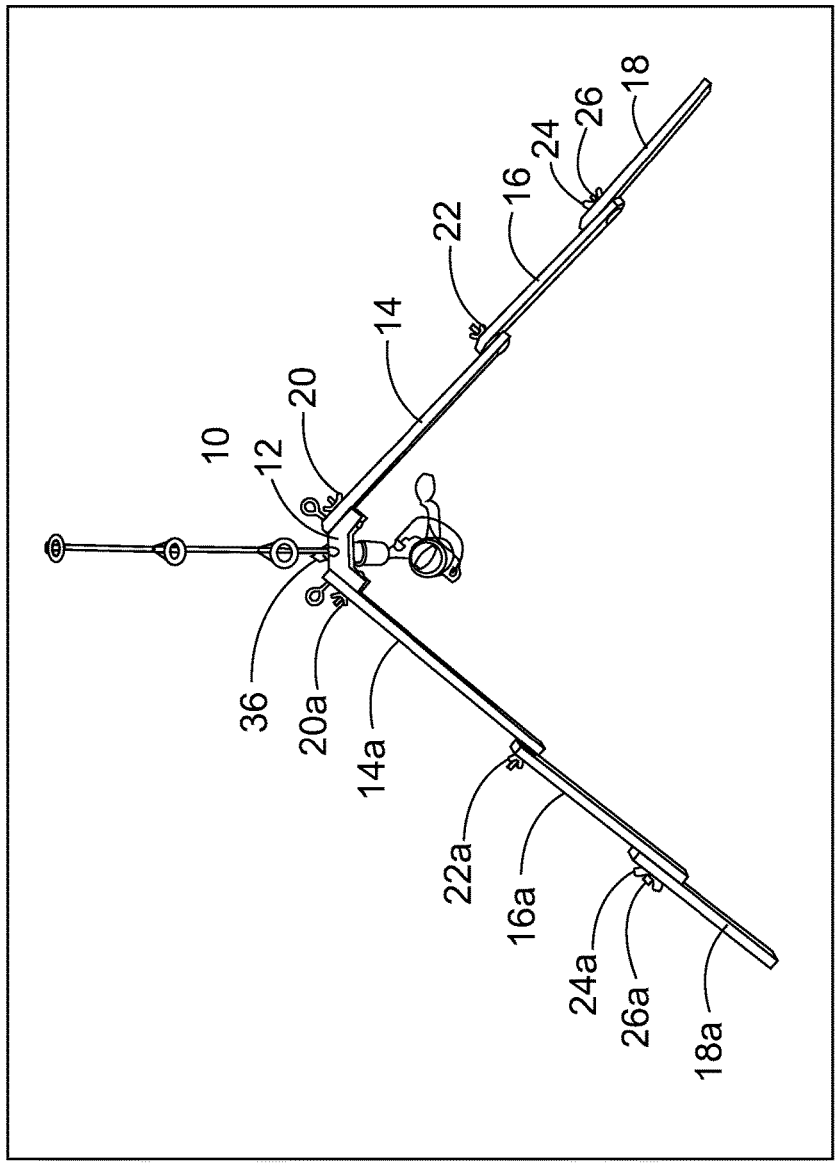
FIG. 1 is a drawing of a fishing rod with the ice fishing arrangement of the present application.

FIG. 1, a fishing rod with the ice fishing arrangement is shown in FIG. 1. The fishing rod 10 is shown attached to the upper portion 12 of the ice fishing arrangement will. A crossmember 12, that is, the upper portion 12, is connected to a first holding member 14. The holding member 14 is connected to a second holding member 16. The holding member 16 is connected to a third holding member 18. Will each of the holding members is connected by thumbscrews to the lower holding member. The crossmember 12 is connected by a thumbscrew 21 two and the first holding member 14 is connected to the second holding member 16 and a thumbscrew 24 is connected to the third holding member with a thumbscrew 24.

Figure 2:
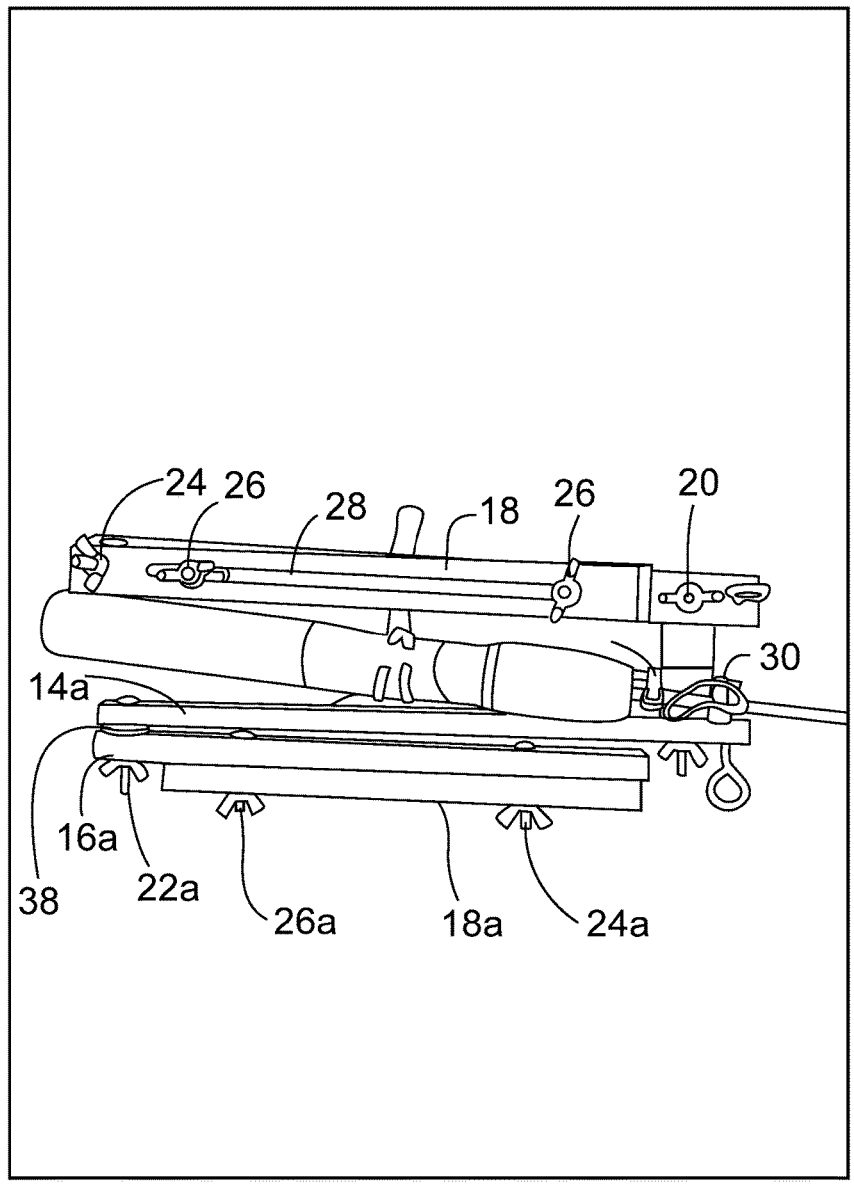
FIG. 2 is a drawing of the fish rod arrangement in its collapsed, compact configuration.

FIG. 2 shows the ice fishing arrangement collapsed for transportation or storage. Therefore, the ice fishing arrangement can be stored in a fishing rod case. the three holding members 14, 16, and 18, provide a very compact arrangement which can be easily transported or carried for immediate use or storage. The from screw for 22 one which old-school the first and second portion together as to washers which hold the first portion 14 and the second portion 16 from one another so that a space is formed between said first portion 14 and said second portion 16 thereby permitting for the heads of the thumbscrews 24 and 26 to clear the first portion 14 and permit rotation will of second portion 16 with respect to first portion 14 without substantial or any resistance to the rotation. The rod is held to the crossmember by two wire wraps 30 and 32. Other means than the two wire wraps 30 and 32 could be used, such as, metal clips.

Figure 3:
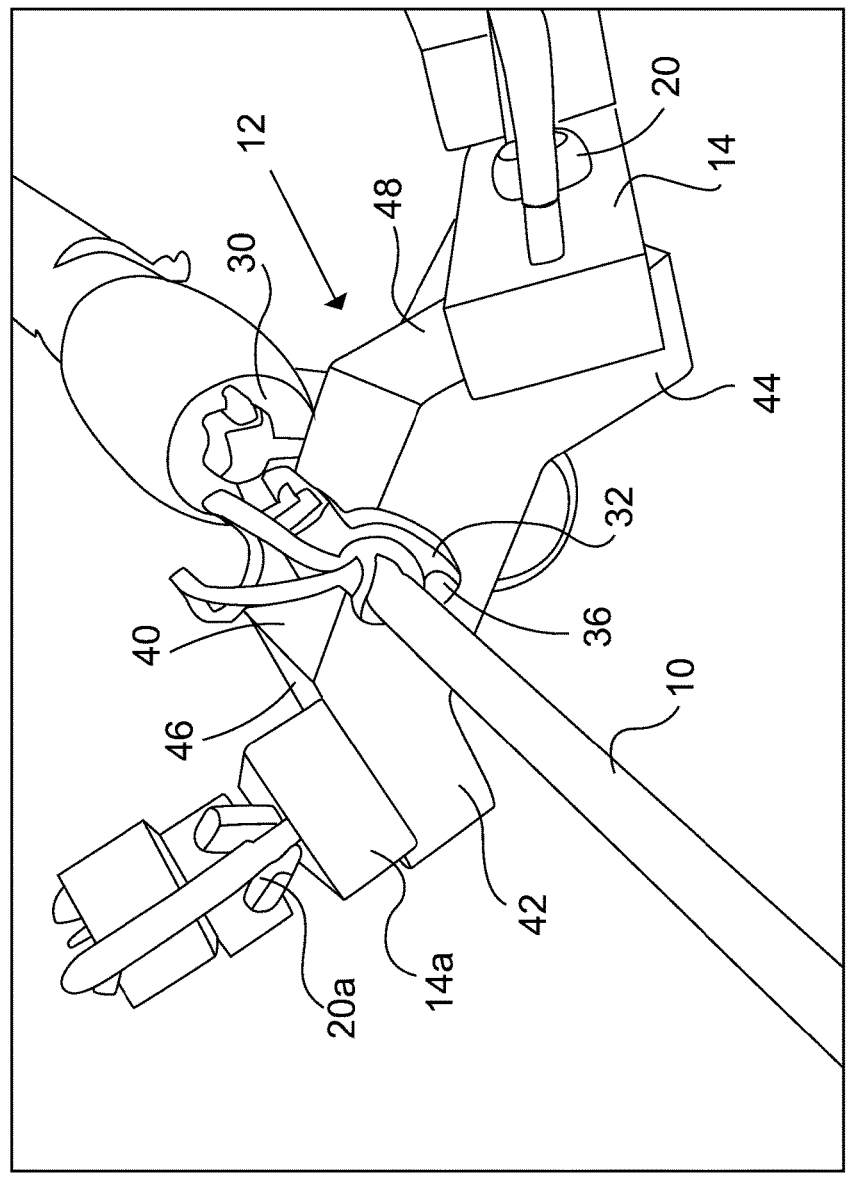
FIG. 3 is a detailed view of the crossmember of the ice fishing arrangement of the present application.

FIG. 3 shows will a detailed view of the crossmember for 12 connected to the first connecting portion 14. As can be seen the first connecting portion 14 can rotate about the crossmember 12 which is at least partially why shaped with a in its middle which is substantially parallel to the area where the rod 10 is installed and the shaped members at forty-five degrees from the middle portion 12A. Two eye screws are connected to the junction area between the crossmember 12 and the first portions 14. Wire wraps 30 and 32 are connected to the cross member to a dowel 36.

The present ice fishing rod arrangement can be adjusted to accommodate uneven ice about a fishing hole which is typically twelve inches or fourteen inches or ten inches in diameter. Therefore the rod can be maintained in a desirable position by adjusting the cross members with respect to the first portion 14. The other portions, second portion 16 and third portion 18 can also be adjusted with respect to one another multiple adjustments of the rod 10 such that any angle or other adjustment in any direction within ranges can be accommodated. This permits the rod to be adjusted up and down from almost ninety degrees with respect to the ice surface to about ten degrees to the ice surface. This further permits the rod to be adjusted at an angle to a front direct position as shown in FIG. 1 to lean left and right of the shown position of FIG. 1 the angle of adjustment can be from approximately ninety degrees with respect to the ice surface to about twenty-five degrees to the ice surface. Also the present ice fishing rod arrangement could be used for fishing from the bank of a water way such as a lake or river or ocean or bay even if the bank is uneven or very 106 uneven.

Further to FIG. 3, a close-up of the crossmember 12 is shown in greater detail. The crossmember 12 has a crosspiece 40 which connects two side pieces 42 and 44. The side pieces 42 and 44 are each disposed at a forty-five degree angle with respect to the crosspiece 40 and the side pieces 42 and 44 are disposed at a ninety degree angle with respect to one another. The first side piece 42 has a surface 46 on which the first holding piece 14a is in contact with and held against the surface 46 with a thumbscrew 20a. The side piece 44 has a surface 48 on which its first holding piece 14 is in contact with and held against that surface 48 by the thumbscrew 20. The first, upper holding piece 14 has an eye screw substantially parallel to the thumbscrew 20. A dowel 36 extends through the crosspiece 40 which assists in holding the rod 10 to the crossmember 12. The two electric cable fasteners 32 and 30 are connected to the dowel 36 which dowel 36 extends through the crossmember 12 and extends out of the crossmember 12 such that the two electric cable fasteners 30 and 32 hold the rod 10 to the crossmember 12. Other arrangements for holding the rod 10 to the crossmember 12 are within the scope of this application. The upper holding pieces 14 and 14a are rotatable about the crossmember 12 permitting a number of configurations according to the terrain or ice on which the ice fishing arrangement is positioned and also to accommodate the desires of the ice fishing arrangement to be made sufficiently wide so that upon a fish being caught by the ice fishing arrangement, it will not be pulled into the ice fishing hole on the frozen body of water. Thereby, saving the ice fishing arrangement from being pulled under the ice and generally lost by the fisherman.

Figure 4:
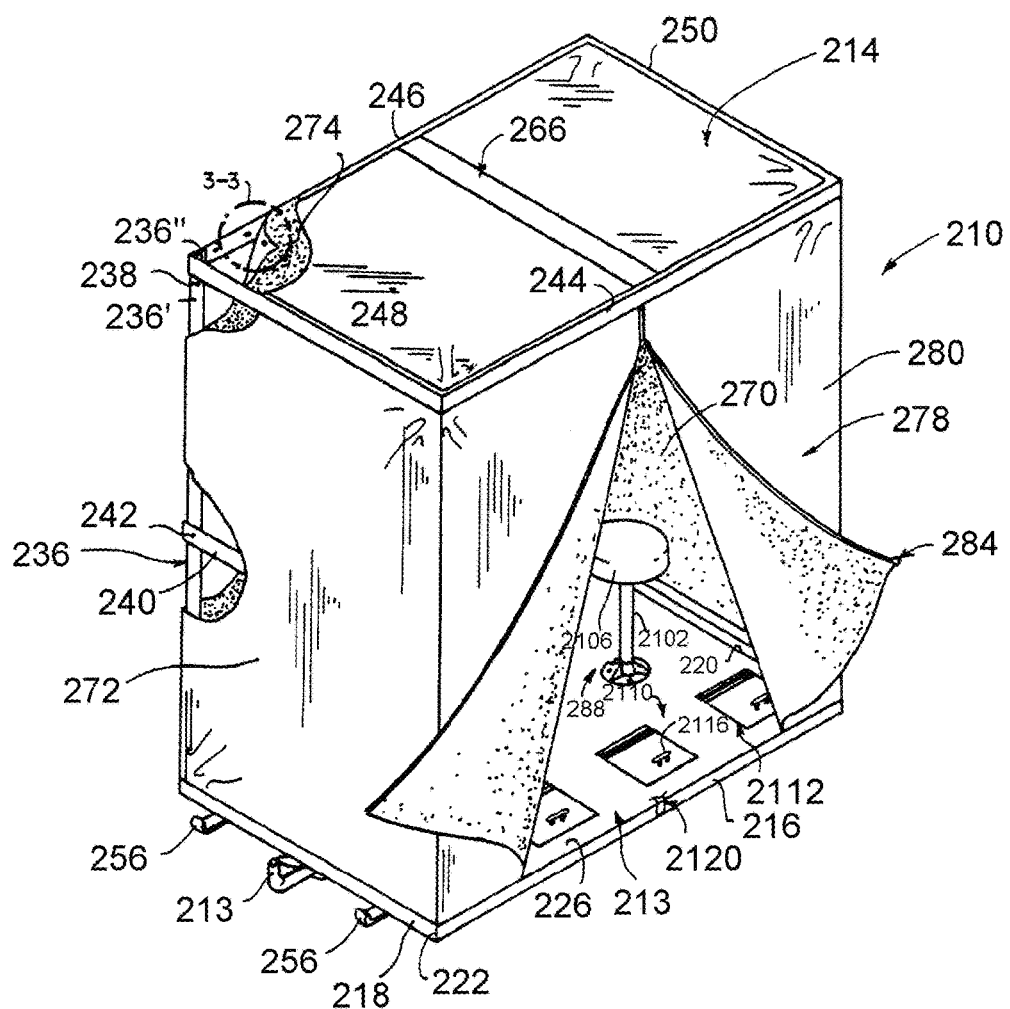
FIG. 4 is a perspective view of the portable, collapsible ice fishing shelter of the present invention in the set-up configuration.

Shown in FIG. 4 is a portable, collapsible ice fishing shelter 210 embodying the present application. The shelter 210 includes a frame assembly 212 and a covering assembly 214 which are separable for storage and transport, yet which are easily couplable for easy set up to comfortably accommodate several occupants, or one occupant who is running several fishing holes at once.

The frame assembly 212 includes a base 213 which is rectangular to have a front side 216, a rear side (not seen in FIG. 4), and ends 218 and 220 which intersect the sides at corners, such as corner 222.

The frame assembly further includes four support blocks, such as block 224. One block is located at each corner of the base, and is firmly affixed to top surface 226 of the base by fasteners, such as bolts or the like. Each block includes a groove 230 in one surface and a groove 232 in an adjacent surface. The grooves are oriented at ninety degrees to each other and extend for essentially the entire length of the block from bottom surface 224b to top surface 224t, and include fasteners, such as bolt 234 embedded in the block, to define a guide slot for a purpose that will be seen from the ensuring discussion.

The frame assembly further includes a plurality of vertical supports, such as support 136 each located at one corner of the base. Each vertical support includes two legs, such as leg 236' and leg 236" of support 236, which intersect each other at a right angle to form an L-shape. Each vertical support is attached to the base 213 at one of the corners of that base, and is affixed to the block located at that corner by the fasteners 234 fitting through holes, such as hole 238 in leg 236' of support 236, and having nuts or the like threaded onto the fastener 234 to lock the support to the block. The slot of the block is shaped and sized to snugly accommodate the vertical support when that support extends upwardly from the base.

The frame assembly further includes a plurality of cross supports, such as cross support 240 connected to adjacent vertical supports by fastener means, such as threaded fastener 242 mounted on the vertical support and extending through a cooperating opening in the cross support. The cross supports are oriented in a plane that is parallel or substantially parallel to a plane containing the base 213 and are spaced vertically therefrom. In at least one possible exemplification, the cross supports are located approximately intermediate the length of each vertical support. One possible exemplification of the shelter 210 includes three cross supports, one on each end and one in the rear of the shelter. The front of the shelter, along side 216 will not have a cross support for reasons that will be apparent from the following disclosure.

The frame assembly further includes a plurality of top elements that are affixed to the top of the vertical elements. These top elements are located in a horizontal plane that is parallel or substantially parallel and spaced from the plane containing the cross supports. The top elements are located to be coplanar with the base sides and ends to form a cube-like structure. Thus, the top elements include front and rear elements 244 and 246 which correspond to the front and rear sides of the base 213, and end elements 248 and 250 which correspond to the base ends 218 and 220, respectively. The cross supports are also co-planar with these top elements and base ends and sides.

A plurality of snap fastener elements, such as element 252, are mounted at spaced apart locations on the top elements and the base sides. Adjacent to one of the snap fasteners is a guide element, such as guide element 254. The function of the snap fasteners and guide elements will be discussed in greater detail below.

A plurality of runners, such as runners 256, are mounted on the bottom surface of the base 213 to facilitate moving the shelter across ice and snow. The runners can be ski-like, but preferably are shaped to include an arcuate leading edge and a following edge which are connected together by a planar body. This shape will support the weight of the shelter while permitting that shelter to be moved easily over the terrain that is expected in ice fishing areas.

The covering assembly 214 is unitary and includes a plurality of sections. One possible exemplification of the shelter includes a tarpaulin-like covering assembly that is attached to the frame assembly by the snap fasteners discussed above. The covering assembly includes a top section 266 that is sized and shaped to correspond in size and shape to the size and shape of the base 213 and which includes snap fastener elements, such as snap fastener element on the perimeter thereof to releasably attach the top section to the frame top elements.

The covering assembly further includes a pair of end sections 270 and 272 and a rear section 274 that are located respectively to be adjacent to the base ends and base rear side. The covering assembly end and rear sections are divided from the top section by the fasteners and have fasteners on the bottom edges thereof to releasably couple those sections to the base via the fasteners on the ends and sides of the base.

The covering assembly is thus quite easily erected after the frame is erected by simply snapping the covering assembly fastener elements to the frame assembly fastener elements.

The covering assembly further includes a front section 278 that has two panels 280 and 282 affixable to the frame top element 244 and to the base side edge 216 by snap fastener elements in the manner discussed above. The panels 280 and 282 are releasably connected by a zipper element 284 to be openable and closable in the manner of a door to permit ingress and egress to and from the interior of the shelter.

Erection and knock-down of the shelter is quite easily effected by simply attaching the vertical supports 236 to the blocks 224, and the cross support elements 240 to the vertical supports. The top elements 244-250 are then attached to the vertical supports, and the covering assembly is attached via the snap fasteners. Knock down of the shelter is the opposite process.

In order to comfortably accommodate a plurality of fisherman, the shelter 210 includes a plurality of spaced-apart seat assemblies, such as seat assembly 288 therein. Each seat assembly includes a base-mounted brace element. The brace element includes a footing element and a guide element, with buttress elements supporting the guide element. The guide element is tubular and is internally threaded to include threads. Fasteners, such as screws, attach the footing element to the frame base 213 as shown in FIG. 4.

Each seat assembly further includes a support post, such as post 102, mounted in the guide element. To this end, each support post includes external threads on one end thereof to cooperate with the internal threads of the footing guide. The support posts are mounted to extend vertically upward from the frame assembly base upper surface, and include a seat element 2106 thereon. Due to the threaded nature of the connection of the support posts to the guide elements, the erection and collapsing of these elements of the shelter is quick and easy. The footing elements can be permanently affixed to the base 213 without interfering with the overall ease of set up and knock down of the overall shelter.

The shelter 210 also includes a fishing assembly 2110 that include a plurality of spaced-apart openings through the base 213 and which are each covered by a cover 2112. Each cover is hingeably attached to the base 213 and includes a handle, such as handle 2116 for opening and closing that cover to open and close the fishing opening in the base.

Each of the openings is located near one of the seat assemblies so that a fisherman seated thereon has easy access to the fishing opening.

The frame assembly further includes a hitch means 2120, schematically illustrated in FIG. 4 for reference. The hitch means includes a double-L shaped body having a first section that is affixed to the base front side 216, and a second section that extends horizontally outward and forward of the base 213 when the section is affixed thereto. A third section extends vertically upwardly from the second section, and a fourth section extends horizontally outward and forward of the third section. The fourth section includes a trailer hitch ball unit thereon, and such ball unit is adapted to connect to a trailer hitch socket assembly on a towing vehicle as is well known in the trailer towing art. The details of the trailer hitch ball and socket elements will not be discussed as those skilled in the art will understand what is included based on the disclosure herein.

Figure 5:
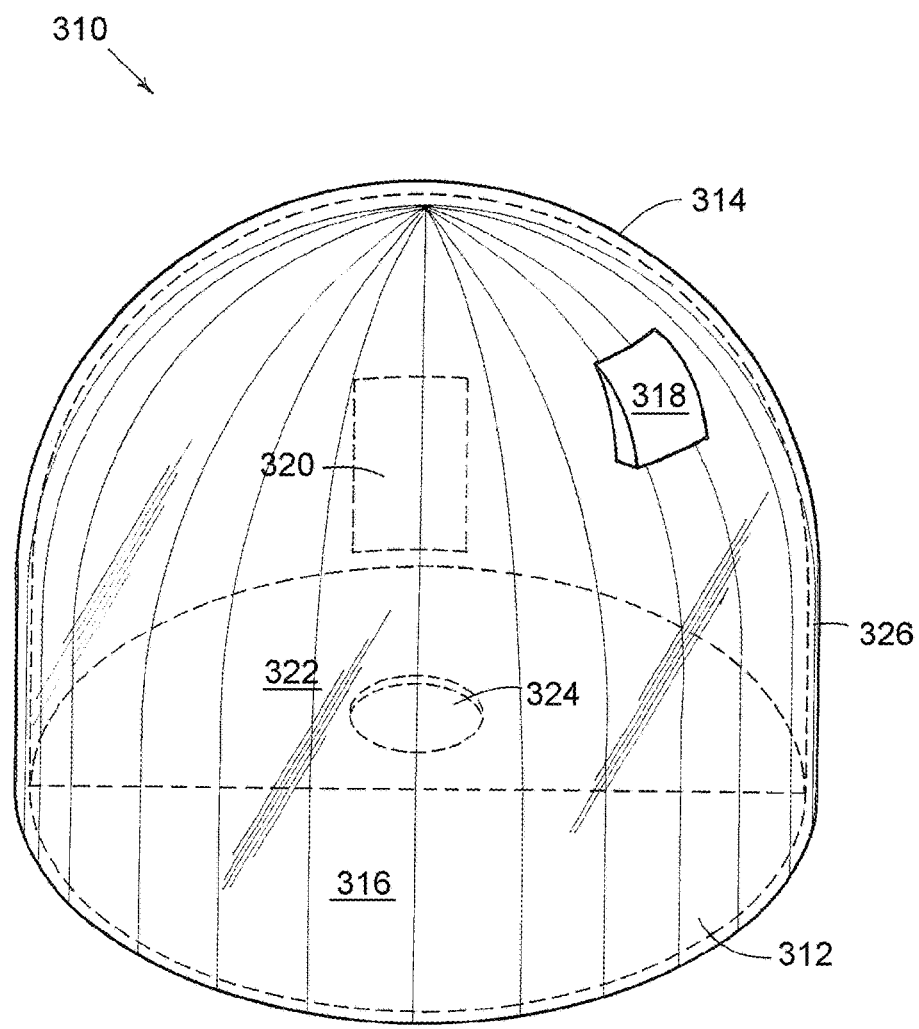
FIG. 5 is a perspective view of the portable igloo-like ice fishing shelter of the present application.

A new and improved ice fishing shelter embodying the principles and concepts of the present application and generally designated by the reference numeral 310 will be described in FIG. 5

In at least one possible exemplification of the present application, it will be noted that the first exemplification 310 of the present application includes a first curved hollow shell half 312 which is connected to a second hollow curved shell half 314 along a flange 326 provided with a VELCRO fastening strip. Curved shell half 314 has a mating flange 328 provided with a cooperating VELCRO fastening strip. The first hollow curved shell half 312 is provided with an integrally molded semicircular floor 316. The hollow curved shell half 314 has an open bottom portion. Thus, the interior of the shell half 314 allows access to the frozen surface 322 of a body of water. A hole 324 may then be cut into the surface 322 to obtain access for ice fishing. The shell half 314 is provided with a hinged door 320 while the shell half 316 is provided with a hooded vent 318.

Figure 6:
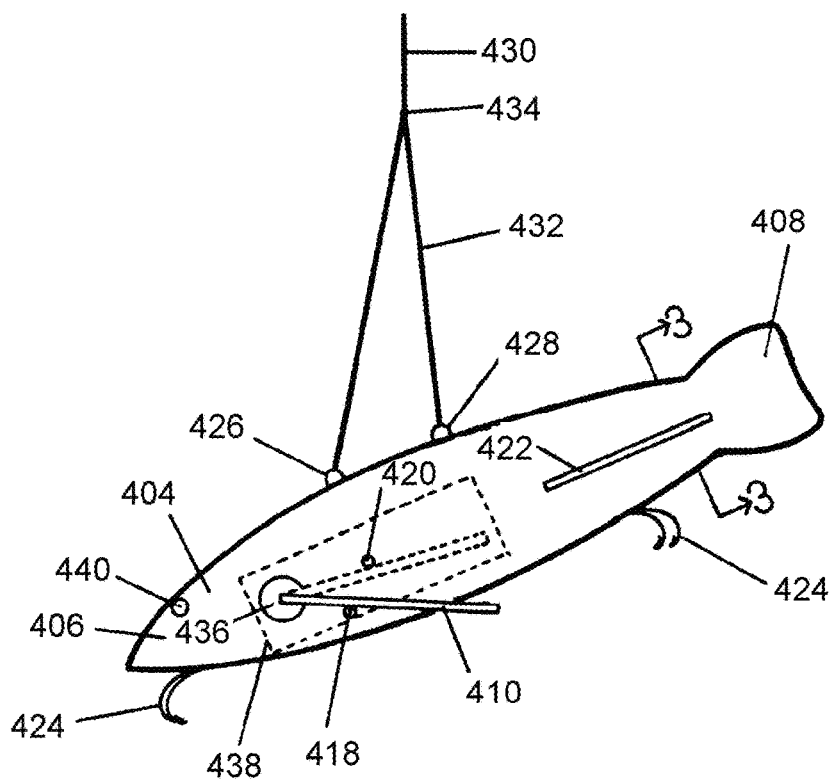
FIG. 6 is a side view of a lure connected to a fishing line.

In FIG. 6, a lure 402 has a stream-lined elongated body 404 to generally simulate a fish. The body 404 has a head 406 and a tail 408, said tail being thin and being curved to one side when the lure is in an upright position. The tail shown in FIG. 6 being curved to the left when the lure 402 is viewed from the rear. Two movable lateral fins 410 are located near said head 406, one lateral fin extending outward from each side of said body 404. Each lateral fin 410 has a forward edge 412 and a rear edge 414. Each lateral fin 410 is pivotally mounted about a pivot point 416 located approximately one-quarter of the distance from said head 406 to said tail 408. There are limiting means, being lugs 418, 420 to limit a degree of rotation of said lateral fins in both directions. There are guide means or rear fins 422 located between said lateral fins 410 and said tail 48. Hooks 424 are suitably placed on said body 404. Eyelets 426, 428 extending from said body 404 provide means for attaching a fishing line 430 to said lure through a secondary line 432. The secondary line is slidably connected to an end 434 of the fishing line 430.

At each pivot point 416, there is located a circular spacer 436 to prevent or restrict or minimize the fin 410 from scraping against the body 404. In at least one possible exemplification, the body 404 contains a central chamber 438 (as outlined by the dotted rectangular shape shown in FIG. 6) in the area of the lateral fins, said chamber 438 containing a weight or weights. The weight or weights (for example, lead) for rapid sinking of the lure 402 in the water and are located in a forward portion of the body to maintain a forward center of gravity in the lure. Depending on the material from which the lure is made, the size of the chamber 438 can be increased, reduced or eliminated entirely. To simulate a fish, the body 404 has two eyes 440 located on either side of said head 406.

Figure 7:
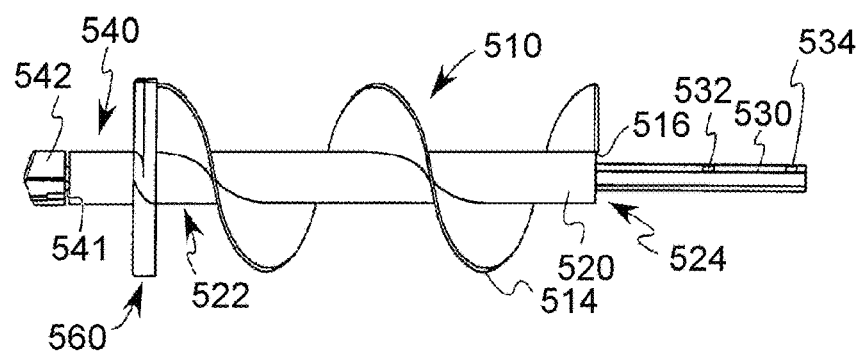
FIG. 7 is a side view illustrating one possible exemplification of the present application.

The auger tool 510, shown in FIG. 7, is for boring into soil or any other particulate material through which a passage needs to be formed and which can be cut by the tool. The tool 510 has an axle 520 around which a helical flight 514 is mounted, preferably by welding at the radially inwardly facing edge 516.

The axle 520 is in one possible exemplification a hollow tube having a first end 522, a second end 524, and a longitudinal axis that defines an axis of rotation, about which the tool 510 can be rotated in a hole-forming operation described below. The tool 510 and its components are made of steel or similar material commonly used for making construction tools, unless otherwise noted. It is possible in one exemplification that the axle 520 is a length that has a relationship to the pitch of the helical flights, thereby causing the flight ends at the ends of the axle to align circumferentially. Thus, looking down the end of the axle 520, the two opposite ends of the flight 514 may begin and end at the same circumferential point.

The second end 524 of the axle 520 has an axle shaft 530 rigidly mounted thereto, such as by welding or press fitting the shaft 530 into the inner bore of the axle 520. The shaft 530 is a multiple sided structure, possibly a three, four, six or eight sided shaft, in at least one possible exemplification a six sided hexagonal shaft, that can be drivingly linked to a portable rotatable machine, such as an industrial drill (not shown), through a drive fitting, which is configured to be mounted in the drill's "chuck" or clamping mechanism.

A nose 540 is mounted to the first end of the axle 520, opposite the shaft 530. The nose 540 has a cutting tip 542, a flight cutter and a shaft. The cutting tip 542 is similar to a conventional router bit having a blade at one end and a cutting tip shaft 541 extending out of the opposite end. The shaft 541 is in one possible exemplification also a multiple-sided shaft, such as a hexagonal shaft, that extends into a housing 50.

The shaft 530 comprises on one of its sides at least one, and in possible exemplification two, cavities 532 and 534, as shown in FIG. 7, as well as a flight cutter 560.

The exemplifications depicted in the photographs show one method of construction. The device could be made of plastic, stamped metal, or wood and portions could be made from bent wire.

Originally designed to be used for ice fishing, the design may be embellished to allow for use year round under various conditions.

One initial design may simply be used as a bi-pod attached to a rod 10 and formed in such a way that either a reel that is mounted on the top of the rod or one that is mounted to the bottom may be used. One advantage of attaching the device to the rod 10 is that a larger fish cannot pull the equipment through the hole in the ice. Therefore the primary legs 14 and 14*a* are in one exemplification of sufficient length to allow for any size hole drilled in the ice. The primary legs 14 and 14*a* may also lock into position to accomplish that end. Unlocked, the legs 14 and 14*a* can swing either backwards along the handle or forwards along the rod 10. This swinging action allows for varying the angle of the rod 10 when adapting to land-based fishing and for collapsing the rig for travel. The angle of the rod 10 may be of little importance when ice fishing. The angle with respect to the ice or water surface may vary from rod to rod as shaft tapers and handle lengths vary.

Ice fishing is commonly done using several devices in different locations in an attempt to locate the fish. The fisherman may be a long distance from his devices, much like a trapper.

Secondary legs 16 and 16*a* with extensions 18 and 18*a* provide more options for the fisherman. These secondary legs 16 and 16*a* provide for versatility to be used for bank fishing on uneven ground. When the secondary legs 16 and 16*a* are in a kneeling position, an ice fisherman can adjust the rod angle any way he wishes (pointing up or down). Also in that position, the secondary legs 16 and 16*a* may be packed under ice to secure the rig in high winds which are often unobstructed on the surface of a leg, pond, river, etc. Secondary legs 16 and 16*a* and extensions 18 and 18*a* may not need to be as strong nor locked into position like the primary legs 14 and 14*a* as they may simply be props. The primary legs 14 and 14*a* alone may perform the purpose of preventing the rig from going through the hole in the ice.

Unseen in the pictures is a groove in the top of the device to assist in aligning it to the rod. The dowel rod may be placed with two small screws to wrap the bread ties or wire ties around to secure the device to the rod. The rubber hand tied in front of the device simply may keep it from sliding on the rod.

One feature or aspect of an exemplification is believed at the time of the filing of this patent application to possibly reside broadly in a method for ice fishing comprising an ice fishing rod and an ice fishing rod holder in combination and forming an ice fishing arrangement, said method comprising: using said ice fishing arrangement method comprising: bringing a ice fishing shelter to a frozen waterway as required; assembling or placing said ice fishing shelter at a desired position on the ice on said frozen waterway; cutting a hole in the ice for ice fishing in accordance with the local laws and/or regulations regarding dimensions and placement of the hole for ice fishing which hole is in the dimensional range of from about eight inches to about fourteen inches or ten inches or twelve inches depending upon local laws and/or regulations; said cutting of said hole in the ice comprising cutting said hole with an auger configured to cut holes in ice for ice fishing; unfolding said ice fishing arrangement from a transportable configuration where the members of the ice fishing holder are folded into a compact configuration; said ice fishing arrangement comprising a cross member; said method further comprising: loosening a thumbscrew holding said first holding portion to said cross-member; unfolding an upper first holding portion from said crossmember and extending said upper holding portion to a convenient angle with respect to said crossmember; unfolding a second holding portion connected to said first portion and extending said second portion to a second convenient angle to said first portion; extending and unfolding a third holding portion connected to said second portion and extending said third portion to a convenient position and angle to said second portion and also to said crossmember, said second portion and said first portion and providing a desirable position for said ice fishing rod; said second and third holding portions having longitudinal slots to permit said extending and two thumbscrews located in said slots; said unfolding of said first portion to said crossmember is done by rotating said first portion with respect to said crossmember around a thumbscrew that is connected to said first portion and said crossmember and permitting the rotation of said first portion to a desirable angle to said crossmember; said unfolding of said second portion to said crossmember comprises adjusting and tightening said thumbscrew to hold said first member in a substantially non-rotatable position with respect to said crossmember; said unfolding of said second portion with respect to said first portion is done by loosening a thumbscrew holding said second portion to said first portion and rotating said second portion with respect to said first portion around a thumbscrew that is connected to said first portion and said second portion and permitting the rotation of said second portion at a desirable angle to said first portion; said unfolding of said second portion to said first portion comprises adjusting said thumbscrew connecting said first portion and said second portion and holding said second member in a substantially non-rotatable position to said first member by first loosening said thumbscrews and then tightening said thumbscrews; unfolding a first, upper holding portion from said crossmember and extending said first, upper portion to a convenient angle; unfolding a second, upper holding portion from said crossmember and extending said second, upper portion to a convenient angle; unfolding said second, second holding portion connected to said second, first portion and extending said second, second portion to a convenient angle, with respect to said second, first portion; extending and rotating a second, third holding portion connected to said second, second portion and extending said second, third portion to a convenient position and angle to said second, second portion and also to said crossmember, said second, second portion and said second, first portion and providing a desirable position of said ice fishing rod with respect to said ice surface; said unfolding of said second, upper portion from said crossmember, which second upper portion is opposite said upper portion on said crossmember, comprising rotating said second, upper portion to a convenient angle; said unfolding of said second, second portion connected to said second, first portion and extending said second, second portion to a convenient angle to said second, first portion and to said first portion, said second portion and said crossmember; extending and folding a second, third holding portion connected to said second, second portion and to a convenient extension and angle to said first portion, said second portion, and said third portion and said ice fishing rod; extending and rotating said second, third portion to said second portion is done by extending said second, third portion with respect to said second portion by loosening thumbscrews that are connected to said second portion and third portion and permitting the extension of said second, third portion in slots in said second, second portion and said second third portion to a desirable angle and extension to said second, second portion; adjusting said first holding portion, said second holding portion, said third holding portion, said second, first holding portion, said second, second holding portion, and said second, third holding portion and adjusting the portion of said rod and compensating for unevenness in the ice surface or on another surface on which the ice fishing arrangement is resting upon or to be resting upon; adjusting an angle between a length dimension of said fishing rod and surface upon which said fishing rod is being rested upon or to be resting upon by adjusting said rotations and extensions of said ice fishing arrangement; said adjusting of an angle between the length of said fishing rod and the surface upon which said ice fishing arrangement is resting upon or to be resting upon by adjusting said angle facing forwardly from a user of said ice fishing arrangement and adjusting the angle transverse to said angle facing forwardly from a user of said ice fishing arrangement; said crossmember comprising a crosspiece and two side pieces connected on each side of said crosspiece; said side pieces extend at a substantially a forty-five degree angle with respect to said cross piece and said side pieces make a ninety degree angle between one another; said two side pieces extending away from one another; said upper portion and said second, upper portion being connected and rotatable about said crossmember; said upper portion being connected and rotatable about an upper surface of its corresponding side piece; said second, upper portion being connected to and rotatable about an upper surface of its corresponding side piece; said upper portion and said second, upper portion being rotatable to permit said upper portion and said second, upper portion, to rotate, such that said upper portion and said second, upper portion are rotatable away from one another; said adjusting of said first holding member, said second holding member, said third holding member, said second, first holding member, said second, second holding member, and said second, third holding member and making said ice fishing arrangement wider than said hole cut in the ice to open an ice fishing hole for the use of the ice fishing arrangement; said ice fishing arrangement upon being collapsed into its compact position being approximate four-and-one-half inches by six-and-one-half inches in width and in depth prior to being extended; attaching an ice fishing hook or fishing lure onto a line of said ice fishing rod; putting said ice fishing hook or lure into the water within said ice fishing hole and adjusting said fishing line and positioning said ice fishing hook or lure at a desired depth; catching a fish on said hooked fishing line or fishing lure; said fish pulling said ice fishing arrangement from its original adjusted position to the ice fishing hole; said adjusting of said ice fishing arrangement to a width greater than said width of said ice fishing hole preventing said ice fishing arrangement from being pulled into said ice fishing hole and disappearing under the water of said frozen body of water; upon fishing being finished, reeling in said fishing line and collapsing said ice fishing arrangement to its original, compact configuration by loosening said thumbscrews and pushing said first and second third holding members and aligning by pushing said first and second third holding members into a position parallel to and making contact with said first and second second holding member substantially along the length of said second holding member; rotating said third, said second, third, said second, and said second, second holding members and aligning said aligned first and said second, first and said second and said second, second holding members with said first holding members and compacting said first, second and third and said second, first, said second, second, and said second, third holding members towards or against said ice fishing rod on a first or a second side of said ice fishing rod; tightening all the thumbscrews and maintaining said ice fishing arrangement in said compact configuration; collapsing or leaving said ice fishing sheltering arrangement on said ice surface; and storing said ice fishing arrangement for use at another time.

One feature or aspect of an exemplification is believed at the time of the filing of this patent application to possibly reside broadly in a method for ice fishing comprising an ice fishing rod and an ice fishing rod holder in combination and forming an ice fishing arrangement, said method comprising: using said ice fishing arrangement method comprising: unfolding said ice fishing arrangement from a transportable configuration where the members of the ice fishing holder are folded into a compact configuration; said ice fishing arrangement comprising a cross member with a notch to hold a fishing rod therein; said method further comprising: loosening a thumbscrew holding said first holding portion to said crossmember; unfolding an upper first holding portion from said crossmember and extending said upper holding portion to a convenient angle with respect to said crossmember; unfolding a second holding portion connected to said first portion and extending said second portion to a second convenient angle to said first portion; extending and unfolding a third holding portion connected to said second portion and extending said third portion to a convenient position and angle to said second portion and also to said crossmember, said second portion and said first portion and providing a desirable position for said ice fishing rod; said second and third holding portions having longitudinal slots to permit said extending and two thumbscrews located in said slots; said unfolding of said first portion to said crossmember is done by rotating said first portion with respect to said crossmember around a thumbscrew that is connected to said first portion and said crossmember and permitting the rotation of said first portion to a desirable angle to said crossmember; said unfolding of said second portion to said crossmember comprises adjusting and tightening said thumbscrew to hold said first member in a substantially non-rotatable position with respect to said crossmember; said unfolding of said second portion with respect to said first portion is done by loosening a thumbscrew holding said second portion to said first portion and rotating said second portion with respect to said first portion around a thumbscrew that is connected to said first portion and said second portion and permitting the rotation of said second portion at a desirable angle to said first portion; said unfolding of said second portion to said first portion comprises adjusting said thumbscrew connecting said first portion and said second portion and holding said second member in a substantially non-rotatable position to said first member by first loosening said thumbscrews and then tightening said thumbscrews; unfolding a first, upper holding portion from said crossmember and extending said first, upper portion to a convenient angle; unfolding a second, upper holding portion from said crossmember and extending said second, upper portion to a convenient angle; unfolding said second, second holding portion connected to said second, first portion and extending said second, second portion to a convenient angle, with respect to said second, first portion; extending and rotating a second, third holding portion connected to said second, second portion and extending said second, third portion to a convenient position and angle to said second, second portion and also to said crossmember, said second, second portion and said second, first portion and providing a desirable position of said ice fishing rod with respect to said ice surface; said unfolding of said second, upper portion from said crossmember, which second upper portion is opposite said upper portion on said crossmember, comprising rotating said second, upper portion to a convenient angle; said unfolding of said second, second portion connected to said second, first portion and extending said second, second portion to a convenient angle to said second, first portion and to said first portion, said second portion and said crossmember; extending and folding a second, third holding portion connected to said second, second portion and to a convenient extension and angle to said first portion, said second portion, and said third portion and said ice fishing rod; extending and rotating said second, third portion to said second portion is done by extending said second, third portion with respect to said second portion by loosening thumbscrews that are connected to said second portion and third portion and permitting the extension of said second, third portion in slots in said second, second portion and said second third portion to a desirable angle and extension to said second, second portion; adjusting said first holding portion, said second holding portion, said third holding portion, said second, first holding portion, said second, second holding portion, and said second, third holding portion and adjusting the portion of said rod and compensating for unevenness in the ice surface or on another surface on which the ice fishing arrangement is resting upon or to be resting upon; adjusting an angle between a length dimension of said fishing rod and surface upon which said fishing rod is being rested upon or to be resting upon by adjusting said rotations and extensions of said ice fishing arrangement; said adjusting of an angle between the length of said fishing rod and the surface upon which said ice fishing arrangement is resting upon or to be resting upon by adjusting said angle facing forwardly from a user of said ice fishing arrangement and adjusting the angle transverse to said angle facing forwardly from a user of said ice fishing arrangement; said crossmember comprising a crosspiece and two side pieces connected on each side of said crosspiece; said side pieces extend at a substantially a forty-five degree angle with respect to said cross piece and said side pieces make a ninety degree angle between one another; said two side pieces extending away from one another; said upper portion and said second, upper portion being connected and rotatable about said crossmember; said upper portion being connected and rotatable about an upper surface of its corresponding side piece; said second, upper portion being connected to and rotatable about an upper surface of its corresponding side piece; said upper portion and said second, upper portion being rotatable to permit said upper portion and said second, upper portion, to rotate, such that said upper portion and said second, upper portion are rotatable away from one another; said adjusting of said first holding member, said second holding member, said third holding member, said second, first holding member, said second, second holding member, and said second, third holding member and making said ice fishing arrangement wider than said hole cut in the ice to open an ice fishing hole for the use of the ice fishing arrangement; said ice fishing arrangement upon being collapsed into its compact position being approximate four-and-one-half inches by six-and-one-half inches in width and in depth prior to being extended; attaching an ice fishing hook or fishing lure onto a line of said ice fishing rod; said fish pulling said ice fishing arrangement from its original adjusted position to the ice fishing hole; said adjusting of said ice fishing arrangement to a width greater than said width of said ice fishing hole preventing said ice fishing arrangement from being pulled into said ice fishing hole and disappearing under the water of said frozen body of water; upon fishing being finished, reeling in said fishing line and collapsing said ice fishing arrangement to its original, compact configuration by loosening said thumbscrews and pushing said first and second third holding members and aligning by pushing said first and second third holding members into a position parallel to and making contact with said first and second second holding members substantially along the length of said second holding member; rotating said third, said second, third, said second, and said second, second holding members and aligning said aligned first and said second, first and said second and said second, second holding members with said first holding members and compacting said first, second and third and said second, first, said second, second, and said second, third holding members towards or against said ice fishing rod on a first or a second side of said ice fishing rod; tightening all the thumbscrews and maintaining said ice fishing arrangement in said compact configuration.

The components disclosed in the patents, patent applications, patent publications, and other documents disclosed or incorporated by reference herein, may possibly be used in possible exemplifications of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one exemplification of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various exemplifications may be used with at least one exemplification or all of the exemplifications, if more than one exemplification is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible exemplification of the present application . . . " may possibly not be used or useable in any one or more exemplifications of the application.

The sentence immediately above relates to patents, patent applications, patent publications, and other documents either incorporated by reference or not incorporated by reference.

The following patents, patent applications, patent publications, and other documents, except of the exceptions indicated herein, are hereby incorporated by reference as if set forth in their entirety herein except for the exceptions indicated herein, as follows: U.S. Pat. No. 4,926,893, having the title "Portable, collapsible ice fishing shelter", issued on May 22, 1990; U.S. Pat. No. 4,796,649, having the title "Ice fishing shelter", issued on Jan. 10, 1989; U.S. Pat. No. 5,088,226, having the title "Fishing lure with rotational lateral fins", issued on Feb. 18, 1992; and U.S. Patent Application Publication No. 2008/0179101, having the title "Auger", published on Jul. 31, 2008.

The following patents, patent applications, patent publications, and other documents, except of the exceptions indicated herein, are hereby incorporated by reference as if set forth in their entirety herein except for the exceptions indicated herein, as follows: U.S. Patent Application Publication No. 2016/0366869, having the title "SELF-ENCLOSED ICE FISHING TIP-UP FISHING LINE SYSTEM", published on Dec. 22, 2016; U.S. Patent Application Publication No. 2012/0216441, having the title "FISHING POLE HOLDER", published on Aug. 30, 2012; U.S. Pat. No. 4,539,750, having the title "Ice cutter and corer", issued on Sep. 10, 1985; U.S. Patent Application Publication No. 2008/0006260, having the title "Transportable Shelter Apparatus with Heated Seat for Ice-Fishing and Hunting", published on Jan. 10, 2008; U.S. Pat. No. 8,550,100, having the title "Portable ice fishing shelter", issued on Oct. 8, 2013; and U.S. Pat. No. 7,014,250, having the title "Ice fishing shelter", issued on Mar. 21, 2006.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the exemplifications therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more exemplifications of the patents, patent applications, patent publications, and other documents, are not considered to be incorporated by reference herein for any of the patents, patent applications, patent publications, and other documents cited herein.

The description of the exemplification or exemplifications is believed, at the time of the filing of this patent application, to adequately describe the exemplification or exemplifications of this patent application. However, portions of the description of the exemplification or exemplifications may not be completely applicable to the claims as originally filed in this patent application, as amended during prosecution of this patent application, and as ultimately allowed in any patent issuing from this patent application. Therefore, any statements made relating to the exemplification or exemplifications are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the exemplification or exemplifications, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. § 1.72(b). As stated in 37 C.F.R. § 1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The exemplifications of the invention described hereinabove in the context of the preferred exemplifications are not to be taken as limiting the exemplifications of the invention to all of the provided details thereof, since modifications and variations thereof may be made without departing from the spirit and scope of the exemplifications of the invention.

What is claimed is:

1. A method of ice fishing comprising the steps of:
    folding a first holding assembly and a second holding assembly joined to a crossmember of an ice fishing rod holder into a collapsed, compact configuration being approximately four-and-one-half inches by six-and-one-half inches in width and in depth, and then transporting said ice fishing rod holder, and an ice fishing rod attached to said crossmember, to an ice fishing location;
    unfolding said first holding assembly by:
        loosening a first thumbscrew holding a first holding portion of said first holding assembly to said crossmember, and then rotating said first holding portion to a desired angle with respect to said crossmember, and then tightening said first thumbscrew to hold said first holding portion in place;
        loosening a second thumbscrew holding a second holding portion of said first holding assembly to said first holding portion, and then rotating said second holding portion to a desired angle with respect to said first holding portion, and then tightening said second thumbscrew to hold said second holding portion in place;
        loosening a third thumbscrew holding a third holding portion of said first holding assembly to said second holding portion, and then rotating said third holding portion to a desired angle with respect to said second holding portion, and then partially tightening said third thumbscrew;
        sliding said third holding portion along a longitudinal slot therein to either increase or decrease the overall length of said first holding assembly, and then tightening said third thumbscrew to hold said third holding portion in place;
    unfolding said second holding assembly by:
        loosening a first thumbscrew holding a first holding portion of said second holding assembly to said crossmember, and then rotating said first holding portion to a desired angle with respect to said crossmember, and then tightening said first thumbscrew to hold said first holding portion in place;
        loosening a second thumbscrew holding a second holding portion of said second holding assembly to said first holding portion, and then rotating said second holding portion to a desired angle with respect to said first holding portion, and then tightening said second thumbscrew to hold said second holding portion in place;
        loosening a third thumbscrew holding a third holding portion of said second holding assembly to said second holding portion, and then rotating said third holding portion to a desired angle with respect to said second holding portion, and then partially tightening said third thumbscrew;
        sliding said third holding portion along a longitudinal slot therein to either increase or decrease the overall length of said second holding assembly, and then tightening said third thumbscrew to hold said third holding portion in place;
    placing said ice fishing rod holder and said ice fishing rod onto an ice surface adjacent an ice fishing hole, such that said third holding portions and a handle of said ice fishing rod are in contact with the ice surface;
    loosening said thumbscrews and adjusting the positions of said holding portions with respect to one another and/or said crossmember, and/or adjusting the position of said ice fishing rod with respect to said crossmember, and thereby compensating for unevenness in the ice surface;
    adjusting the positions of said holding portions with respect to one another and/or said crossmember, such that the lengths of said first and second holding assemblies together exceed the width of the ice fishing hole to thereby prevent said ice fishing rod holder, with said ice fishing rod attached thereto, from passing through the ice fishing hole and into a body of water under the ice surface;
    finally tightening said thumbscrews to lock all said holding portions in place;
    attaching an ice fishing hook or fishing lure onto a line of said ice fishing rod, and then lowering said ice fishing hook or fishing lure through the ice fishing hole and into the body of water;
    permitting a fish to grab said ice fishing hook or fishing lure and pull said ice fishing rod toward and into the ice fishing hole;
    preventing the fish from pulling the entirety of said ice fishing rod into the body of water by blocking passage of said ice fishing rod holder through the ice fishing hole with said first and second holding assemblies, then retrieving said ice fishing rod out of the body of water;
    upon fishing being finished, reeling in said fishing line, and then loosening said thumbscrews and folding up said first and second holding assemblies into said collapsed, compact configuration that is aligned with the handle of said ice fishing rod attached thereto; and
    tightening said thumbscrews and locking said ice fishing rod holder in said collapsed, compact configuration for transport.

* * * * *